United States Patent
Rana et al.

(10) Patent No.: US 9,087,110 B2
(45) Date of Patent: Jul. 21, 2015

(54) PRIORITIZING ONLINE RELATIONSHIPS

(71) Applicant: MyLife.com, Inc., Los Angeles, CA (US)

(72) Inventors: Sumeet Rana, Redondo Beach, CA (US); Dong Chang, Los Angeles, CA (US); David Wolfe, La Cresenta, CA (US)

(73) Assignee: MYLIFE.COM, INC., Los Angeles, CA (US)

( * ) Notice: Subject to any disclaimer, the term of this patent is extended or adjusted under 35 U.S.C. 154(b) by 0 days.

(21) Appl. No.: 14/094,651

(22) Filed: Dec. 2, 2013

(65) Prior Publication Data

US 2014/0089306 A1 Mar. 27, 2014

Related U.S. Application Data

(60) Provisional application No. 61/893,801, filed on Oct. 21, 2013.

(51) Int. Cl.
*G06F 17/30* (2006.01)

(52) U.S. Cl.
CPC ...... *G06F 17/30554* (2013.01); *G06F 17/3053* (2013.01)

(58) Field of Classification Search
CPC ............... G06F 17/3053; G06F 17/30554
USPC ................... 707/731, 732, 734, 750
See application file for complete search history.

(56) References Cited

U.S. PATENT DOCUMENTS

| | | | |
|---|---|---|---|
| 6,832,245 B1 | 12/2004 | Isaacs et al. | |
| 7,580,363 B2 | 8/2009 | Sorvari et al. | |
| 7,593,925 B2 | 9/2009 | Cadiz et al. | |
| 7,752,553 B2 * | 7/2010 | Pennington et al. | 715/751 |
| 7,908,647 B1 * | 3/2011 | Polis et al. | 726/5 |
| 8,009,678 B2 | 8/2011 | Brooke | |
| 8,150,017 B2 | 4/2012 | Gharachorloo et al. | |
| 8,499,048 B2 * | 7/2013 | Malik et al. | 709/206 |
| 2006/0036688 A1 | 2/2006 | McMahan et al. | |
| 2006/0085415 A1 | 4/2006 | Jian | |
| 2008/0147639 A1 * | 6/2008 | Hartman et al. | 707/5 |
| 2009/0119678 A1 | 5/2009 | Shih et al. | |
| 2009/0177744 A1 | 7/2009 | Marlow et al. | |

(Continued)

OTHER PUBLICATIONS

Shlomo Berkovsky et al., "Personalized Network Updates: Increasing Social Interactions and Contributions in Social Networks", Jul. 20, 2012, Springer Berlin Heidelberg, UMAP 2012, LNCS, pp. 1-13.*

(Continued)

*Primary Examiner* — Scott A Waldron

(74) *Attorney, Agent, or Firm* — Kilpatrick Townsend & Stockton LLP

(57) ABSTRACT

Systems and methods for generating a set of priority contacts based on their strength of relationship with a user. Contacts of users and communications from those contacts are aggregated across multiple online accounts into a single set of communications. An affinity score is calculated for each of the user's contacts based on adding up the total weight and frequency of communications with the user and a predetermined number of contacts having the highest affinity score can be identified as priority contacts. The affinity score is used to filter the news feed in a user interface display so that only communications from priority contacts are displayed in the news feed.

22 Claims, 7 Drawing Sheets

(56) References Cited

U.S. PATENT DOCUMENTS

| | | | |
|---|---|---|---|
| 2009/0234874 A1 | 9/2009 | Sylvain | |
| 2010/0042600 A1 | 2/2010 | Orr et al. | |
| 2010/0082693 A1 | 4/2010 | Hugg et al. | |
| 2010/0306185 A1 | 12/2010 | Smith et al. | |
| 2011/0194682 A1 | 8/2011 | Hans et al. | |
| 2011/0196876 A1 | 8/2011 | Seeger et al. | |
| 2011/0231407 A1 | 9/2011 | Gupta et al. | |
| 2011/0238673 A1 | 9/2011 | Carter et al. | |
| 2011/0244838 A1 | 10/2011 | Chang | |
| 2012/0124059 A1 | 5/2012 | Pratt et al. | |
| 2012/0150772 A1* | 6/2012 | Paek et al. | 706/12 |
| 2012/0191777 A1 | 7/2012 | Iwasaki et al. | |
| 2012/0246245 A1 | 9/2012 | Nilsson | |
| 2012/0330980 A1 | 12/2012 | Rubin et al. | |

OTHER PUBLICATIONS

Mikko Honkala & Yanqing Cui, "Automatic On-Device Filtering of Social Networking Feeds", Oct. 17, 2012, ACM NordiCHI '12, pp. 721-730.*

Netvibes, "Netvibes General Documentation", 124 pages, crawled by the Internet Archive Wayback Machine on Jan. 24, 2011.*

Rana et al., "Supporting Ubiquitous Interaction in Dynamic Shared Spaces through Automatic Group Formation Based on Social Context.", 2012, 2012 ASE International Conference on Social Informatics (SociallInformatics 2012) / 2012 ASE International Conference on Cyber Security (CyberSecurity 2012) / 2012 ASE International Conference on BioMedical Computing, pp. 121-130.

Related Academic Work: Contacts Priority Ranking Algorithm | Group 7: OrientExpress Blog, downloaded Jul. 29, 2013, 4 pages. http://blog.soton.ac.uk/orientexpress/2012/04/17/related-academic-work-1/.

"Smarter makes your overwhelming contact list a whole lot (yep) smarter". May 2, 2012, Downloaded Jul. 29, 2013, 11 pages. http://www.coolmomtech.com/2012/05/smartr_app_contact_list_management.php.

* cited by examiner mylife beta | Identity | Connections | Messages

Search by: Name ▾ | First Name | Last Name | Last Known Location 🔍

People
- Everyone
- ○ Priority Connections

Content
- All Content
- ○ Popular Social Posts

Accounts
- ☑ All Accounts
- ☐ Facebook
- ☐ Linkedin
- ☐ Twitter
- ☐ Gmail
- ☐ MyLife

Manage
- ⊞ Add / Edit Accounts
- ⊞ Set Priority Connections
- ⊞ Hide Connections
- ⊞ Update Request ✓ You have 67 messages To: ✕

HuffingtonPost — 2m ☆ 📷
"Show" star says cast isn't allowed to wear bras http://t.co/ZOr1IJMsm1
Reply Retweet Favorite — 5 retweets WSJ — 3m ☆ 📷
Five years after the financial crisis, 113 small to midsize U.S. banks still owe taxpayers about $2.7 billion. http://t.Co/DIXf5Z05A5
Reply Retweet Favorite — 14 retweets Diane Doe — 7m ☆ ✉
Glad you could make it to this weeks event. Everyone was excited.
Reply Forward — 2 emails John Doe — 7m ☆ f
I am impressed with how productive I was today, just kidding....
Like Comment — 3 likes Shawn Doe — 8m ☆ in
Shawn Doe is now connected to Matt Doe, Managing Director

Life Events
- Mike Doe is now Group Sales Manager at Sample Enterprise Solutions
- Patrick Doe is now Counsel at Perkins Example LLP
- Diane Doe's birthday is on September 25

9 more

Auto Organize your Connections
Janet Smith — Groups Family Friends
ORGANIZE AND UPDATE NOW

1 People Are Searching for You
Female, 41
San Francisco, CA
FIND OUT WHO

0 People Viewed Your Profile
Update your info to control what people see
Add College
We'll notify you when someone views

PRIORITIZING ONLINE RELATIONSHIPS

CROSS-REFERENCES TO RELATED APPLICATIONS

This application claims the benefit of U.S. provisional application No. 61/893,801, filed Oct. 21, 2013, the entirety of which is incorporated by reference herein.

FIELD OF THE INVENTION

The embodiments described herein relate generally to prioritizing online contacts. More particularly, the embodiments described herein relate to a systems and methods for automatically generating a set of priority contacts based on their strength of relationship with a user.

BACKGROUND OF THE INVENTION

Online social and professional networks, wireless communications networks, and email messaging accounts provide a number of different platforms with different communications channels and different means of communicating between users. Conventionally, users of these accounts would have to sign up for each account and create login credentials such as a user name and password. To get their messages or other communications, users would then have to logon to each account individually. Some recent systems have attempted to solve this problem by providing users with the ability to aggregate their online accounts in a centralized account, but those systems suffer from the disadvantage of overload of messages in the news feed display of the centralized account.

SUMMARY OF THE DESCRIPTION

Systems and methods disclosed herein relate to generating a set of priority contacts based on their strength of relationship with a user. Using the techniques introduced herein, contacts of users and communications from those contacts can be aggregated across multiple online accounts into a single set of communications in a centralized queue. The communications can then be analyzed to determine the category and frequency of the communications and weights can be assigned to each different category of communication based on a set of rules adapted to show the level of affinity of a particular contact with the user (and vice versa). An affinity score is calculated for each of the user's contacts based on adding up the total weight and frequency of communications with the user and a predetermined number of contacts having the highest affinity score can be identified as priority contacts. The affinity score can then be used to filter the news feed in a user interface display so that only communications from priority contacts are displayed in the news feed and other contacts are filtered out.

These and other embodiments along with many of their advantages and features are described in more detail in conjunction with the description below and attached figures.

BRIEF DESCRIPTION OF THE DRAWINGS

FIG. 5 depicts an example graphical interface for displaying communications from multiple online accounts of different types into a single news feed based on prioritized contacts according to one embodiment.

DETAILED DESCRIPTION

Figure 1:
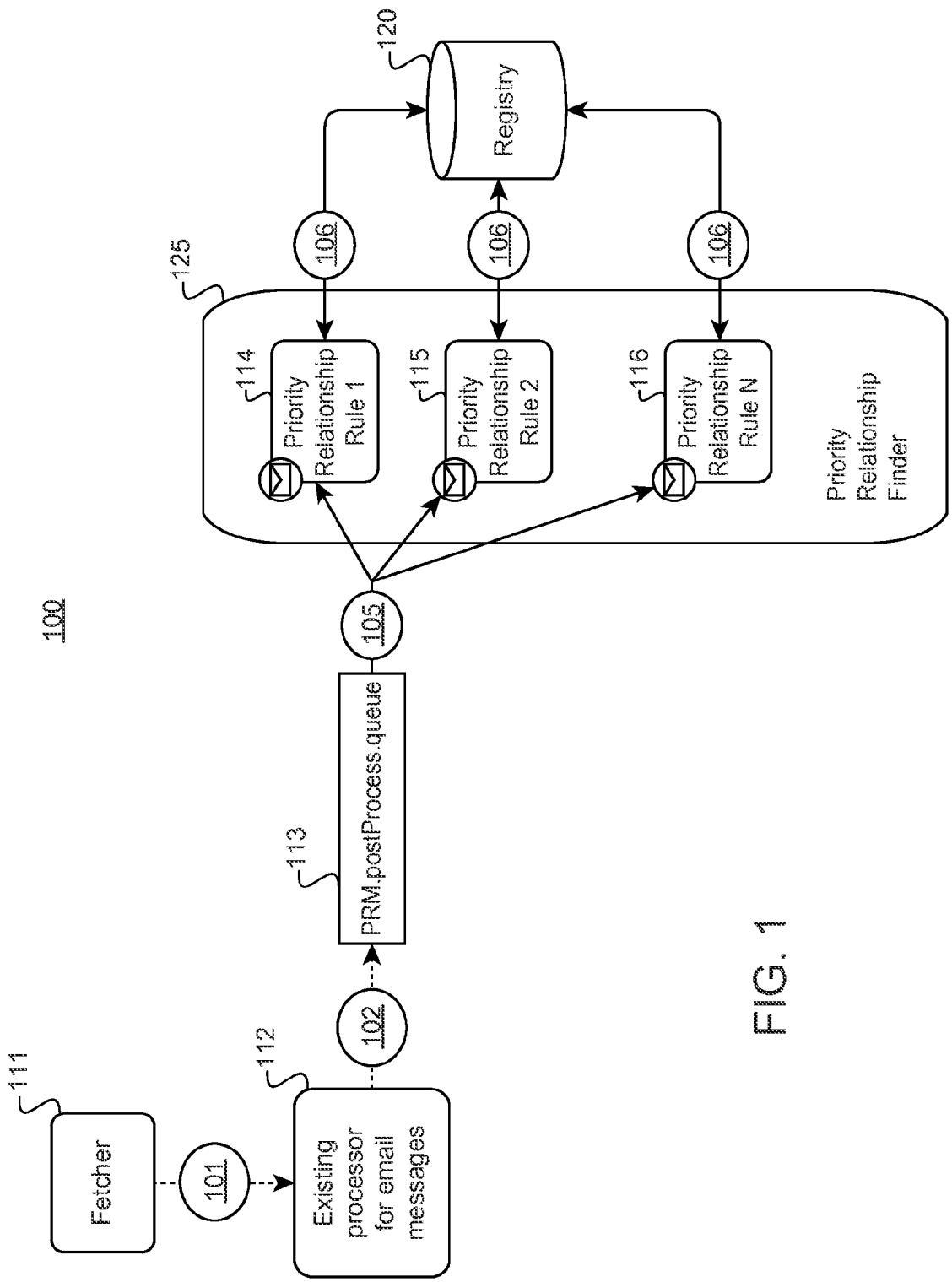
FIG. 1 depicts an example block diagram of a process for prioritizing relationships based on analyzing email communications according to one embodiment.

Throughout this description for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the described embodiments.

The systems and methods introduced herein allow users to manage their entire life online across multiple accounts including social networks and wireless phone and email communications accounts. Systems and methods disclosed herein are adapted to automatically generate a set of priority contacts based on their strength of relationship with a user. Using the techniques introduced herein, contacts of users and communications from those contacts can be aggregated across multiple online accounts into a single set of communications in a centralized queue. For instance, embodiments enable users to access and connect with their friends and professional contacts across multiple accounts such as Facebook, LinkedIn, Twitter, Gmail, Yahoo!, YouTube, iCloud, AOL, Hotmail, wireless phone, etc. The communications can then be analyzed to determine the category and frequency of the communications and weights can be assigned to each different category of communication based on a set of rules adapted to show the level of affinity of a particular contact with the user (and vice versa). An affinity score is calculated for each of the user's contacts based on adding up the total weight and frequency of communications with the user and a predetermined number of contacts having the highest affinity score can be identified as priority contacts. The affinity score can then be used to filter the news feed in a user interface display so that only communications from priority contacts are displayed in the news feed and other contacts are filtered out.

Numerous benefits are achieved by way of the techniques described herein over conventional techniques. For example, embodiments provide users with the ability aggregate communications from their contacts across multiple online accounts, such as social networks and wireless and email communications accounts into a centralized account and to display those communications in a single news feed. As used herein, the term "communications" is intended to be interpreted broadly to include any type of electronic communication between a user and his or her contacts including email or text messages, social media "likes," comments, shares, messages, "pokes" or posts, as well as practically any other online communication. These communications can then be filtered in a manner such that only communications from a predetermined number of priority contacts having the strongest relationship with the user are displayed. Among other things, this helps prevent overload of communications in the centralized account. Other advantages include enabling users to (1) search for and update priority connections all in one place, (2) monitor and manage a user's online identity, and (3) share communications with priority contacts and receive prioritized communications. Users can post and receive messages across each of their online accounts as well as get up-to-date information and alerts from other users who are identified as prioritized contacts.

A process of prioritizing relationships based on analyzing communications from one or more online accounts is described below with reference to FIGS. 1, 2, and 4. It is noted that the processes described below are exemplary in nature and are provided for illustrative purposes and not intended to limit the scope of the invention to any particular example embodiment. For instance, methods in accordance with some embodiments described herein may include (or omit) some or all of the operations described below, or may include steps in a different order than described herein. FIG. 1 depicts an example block diagram of a process for prioritizing relationships based on analyzing email communications according to one embodiment. At least certain embodiments include a personal relationship manager ("PRM") adapted to aggregate users' online communications. The PRM can be implemented in hardware or software or any combination thereof. The PRM enables users to aggregate communications from multiple accounts and to filter those communications so that only communications from priority connections are displayed. In the illustrated embodiment of FIG. 1, the PRM post process queue 113 represents the centralized queue wherein users' email communications are aggregated across one or more email accounts.

Process 100 begins at operation 101 where an email message fetcher 111 provides email messages from an existing email account to an existing email message processor 112. Fetcher 111 can be implemented in hardware or software, or any combination thereof. Each aggregated email account in the system includes its own email fetcher 111. At operation 102, the email message processor 112 transmits processed email messages to the PRM post process queue 113 which aggregates the messages from one or more email accounts and analyzes them to determine a weight for each email message. To do this, at operation 105, PRM post process queue 113 applies a number of priority relationship rules 114-116 to the email communications using priority relationship finder 125. The priority relationship rules for each priority relationship of a user are stored in registry database 120. At operation 106, the priority relationships rules are accessed from registry database 120. The priority rules are then applied to the communications stored in PRM post process queue 113 to determine a weight for each message. Once the communications are weighted, the weights can be added up to determine an overall affinity score of each contact with the user, which can be used to filter communications displayed in the user's message feed in the user interface of the centralized account. This completes process 100 according to one example embodiment.

Figure 2:
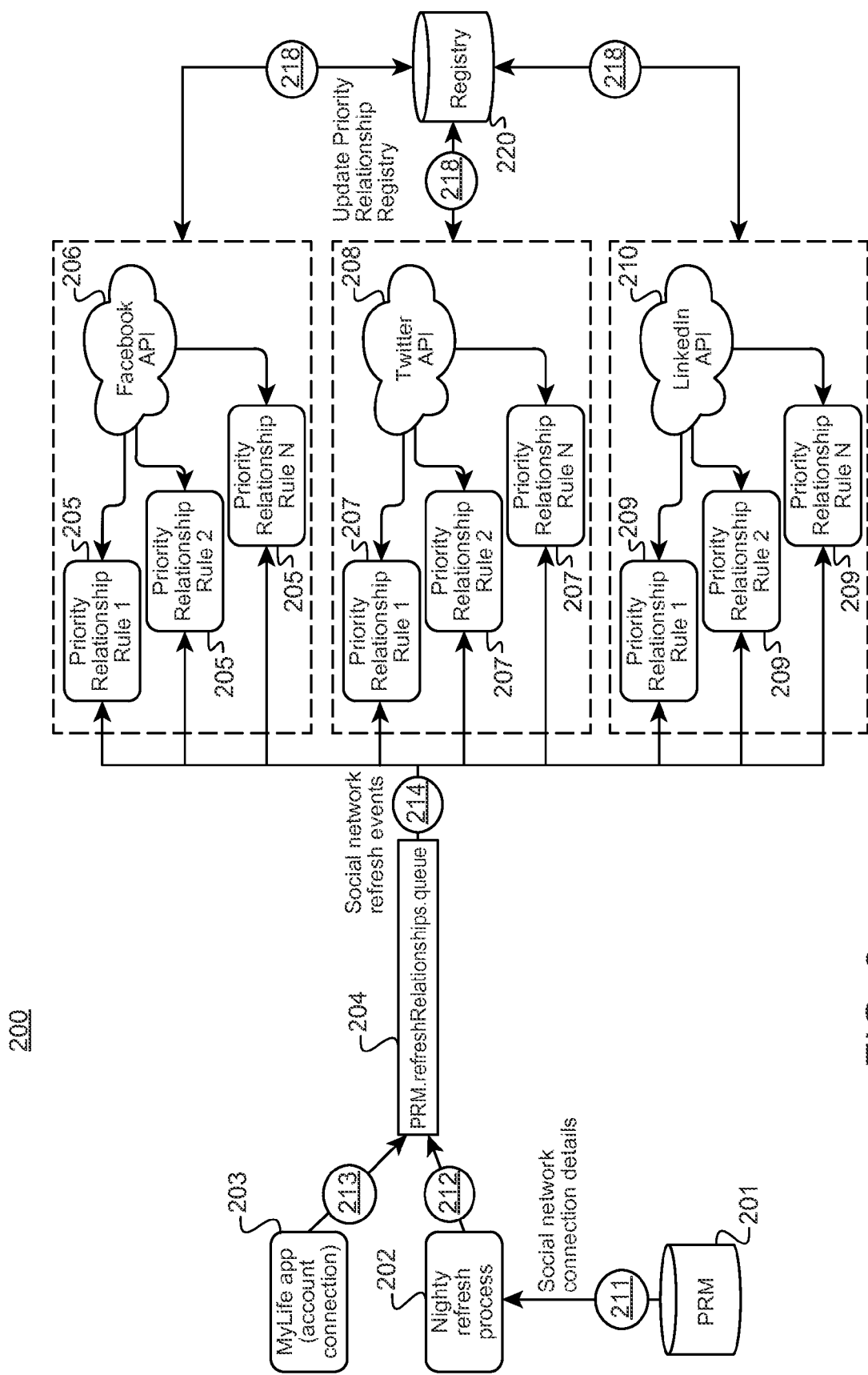
FIG. 2 depicts an example block diagram of a process for prioritizing relationships based on analyzing social network communications according to one embodiment.

FIG. 2 depicts an example block diagram of a process for prioritizing relationships based on analyzing social network communications according to one embodiment. In the illustrated embodiment, process 200 begins at operation 211 by providing social network connections details from the PRM 201 to a nightly refresh process 202, which, in turn, provides the social network connection details to a PRM refresh relationships queue 204 at operation 212. The PRM refresh relationships queue 204 is a component of the PRM 201 that aggregates communications from contacts across one or more online accounts. This is given by way of example and not of limitation as the social network details can be refreshed over any predetermined time period.

In at least certain embodiments, the PRM refresh relationships queue 204 is the same queue as the PRM post process queue 113 discussed with respect to FIG. 1 above. The reason for this is that in these embodiments, all communications are aggregated in a centralized queue including both email messages and social network communications such as likes, posts, comments, shares, events, and messages. Other embodiments are possible. For instance, a separate queue for different categories can be provided and communications can be aggregated based on time stamp. Process 200 continues at operation 213 where details of the centralized account are also provided to the PRM refresh relationships queue 204. At operation 214, priority relationship rules are applied to the communications stored in the queue 204 for each category of communication from each of the multiple online social network accounts to determine weights for those communications. As shown, priority relationship rules 205 obtained from a Facebook application programming interface ("API") 206, priority relationship rules 207 from a Twitter API, and priority relationship rules 209 from a LinkedIn API are each applied to the appropriate communications in queue 204.

The priority relationship rules for each priority relationship of a user are stored in registry database 120. At operation 218, the priority relationships rules are accessed from registry database 220. The priority rules are then applied to the communications stored in queue 204 to determine a weight for each communication. Once the communications are weighted, the weights can be added up to determine an overall affinity score of each contact with the user, which can be used to filter communications displayed in the user's message feed in the user interface of the centralized account. This completes process 200 according to one example embodiment.

Provided below are descriptions of illustrative systems and apparatuses upon which the embodiments described herein can be implemented. Although some of the components or devices described herein may be depicted as separate components or devices, in some instances one or more of those components or devices may be combined into a single device or system. Similarly, although certain functions may be described as being performed by a single combined component or device, in some instances the functions may be performed by multiple separate components within a device or system. Communication between components and devices described herein may comprise the exchange of data or information using electronic messages on any suitable electronic communication medium as described below. As will be appreciated by one of ordinary skill in the art, the devices and systems described below may have only some of the components described below, or may have additional components. In addition, embodiments may be practiced with various system configurations such as with hand-held devices, microprocessors, microprocessor-based or programmable user electronics, minicomputers, mainframe computers, or similar systems. The embodiments can also be practiced in distributed computing environments where tasks are performed by remote processing devices that are linked through a wired or wireless network.

Figure 3:
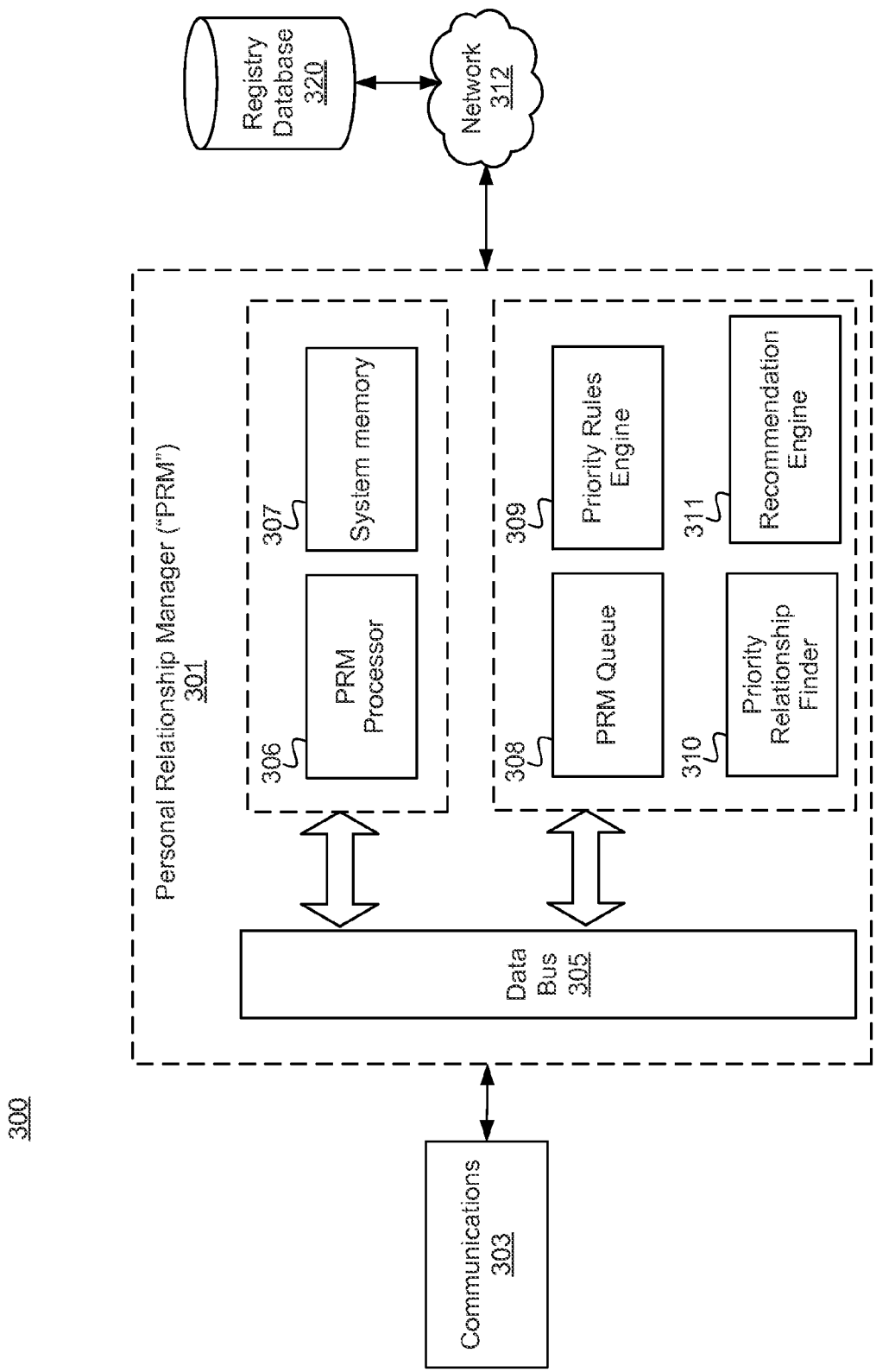
FIG. 3 depicts an example block diagram of a system for managing personal relationships based on analyzing communications from multiple online accounts of different types according to one embodiment.

FIG. 3 depicts an example block diagram of a system for managing personal relationships based on analyzing communications from multiple online accounts of different categories according to one embodiment. In the illustrated embodiment, system 300 includes a PRM 301 configured to enable users to aggregate all their email and text messages and social network updates and events into one centralized account using a simple dashboard user interface display for saving time and simplifying communications. As shown in the illustrated embodiment, PRM 301 includes a processor 306 and a system memory 307 coupled with the processor. A data bus 305 connects is adapted to connect the system components together and to provide a pathway for communicating data and control signals between system components. PRM 301 further includes a PRM queue 308 for aggregating communications from one or more online accounts. Communications 303 from the various online accounts of a user are provided to PRM 301 and stored in PRM queue 308.

A priority rules engine 309 can also be provided to set rules to assign weights to each communication exchanged with users of the system. Rules engine 309 applies priority relationship rules to the communications stored in queue 308 so that weights can be assigned to each communication based on the category and type of the communication. These initial weights have been assigned based on research as to what factors tend to show the level of the strength of relationship with a user compared to other categories and types of communications. That is, initially the rules may be predetermined based on research into what types and categories of communications tend to show affinity for the user as well as the degree or level of affinity. However, the weights are adaptable over time based on analyzing the user's online behavior and communications patterns over time and adjusting the rules accordingly. In addition, different weights can then be assigned to different types of communications from different communication channels corresponding to the various different accounts that can be aggregated by the system. For instance, a Facebook "comment" can be assigned a more valuable weight than a Facebook "like" because a comment shows more engagement with the user than a like does. Table 1 is given below depicts one embodiment of the weights (or "points") that are assigned to each communication initially.

Referring back to the illustrated embodiment of FIG. 3, a priority relationship finder 310 is also provided to identify priority contacts from among user contacts across one or more accounts. The priority relationship finder 310 is adapted to sum up all these weights/points across all communications with the user to determine an affinity score (or "P score") for each contact based thereon. In one embodiment, if the affinity score is higher, the contact is more likely to be listed higher among the user's priority contacts. In order to provide relevant information this techniques described herein assume that the user would like to consume content (messages, posts, photos, videos etc.) from contacts the user has the strongest relationships with. The strength of the relationship can then be calculated using an algorithm such as the one described below. In this way, the strength of relationship of the contact with the user can be calculated as an affinity score between the two thereby allowing information to flow from the contacts a user is most engaged with.

TABLE 1

| Events | Pts |
| --- | --- |
| Facebook User Like | 4 |
| Facebook Friend Comment | 2 |
| Facebook Posts | 1 |
| If Contact Found In People Search | 10 |
| If FB Friend Is Also A LinkedIn Contact | 5 |
| If LinkedIn Connection Is Also In Email Contact Lists | 10 |
| If FB Friend Is Also In One Of Email Addresses | 10 |

TABLE 1-continued

| Events | Pts |
| --- | --- |
| LinkedIn Messages | 2 |
| Emails From Email Network | 2 |
| Email Conversation Involving More Than One Email On The Same Subject | 5 |
| Messaging Involves Events | 5 |
| User Email/Message Has A Follow-Up (Follow-Up Flag) | 10 |
| Email With Picture Attachments | 10 |
| Facebook Message | 2 |

In at least certain embodiments, the affinity score is calculated based on multiplying the frequency of communications in a particular category with the weight of those communications wherein the frequency of communications is given by the number of communications with the user in a particular category divided by the total number of messages in that category as shown in the equation below:

$$P \text{ score (current date)} = \sum_{1}^{(number\ of\ catagories)} \left((\text{weightage of this catagory (until date)}) \frac{\text{number of messages in this catagory}}{\text{number of messages in all catagories}}\right)$$

where the affinity score (or "P" score) is equal to the frequency of messages multiplied by the weight of those messages for each particular category (e.g., email accounts, social networks, mobile networks, or essentially any platform) divided by the total number of messages exchanged with the user in that category.

This concept can be shown by the following two cases. In case 1, User A has exchanged one LinkedIn message, two Facebook messages, three Facebook posts (e.g., User B tagged User A in a photo or User B uploaded a photo of User A), and four email messages with User B. Based on the above, the total P score would be calculated as follows:

$P$ score=1/10*2+2/10*2+3/10*2+4/10*2=0.2+0.4+ 0.6+0.8=2.0

Similarly in case 2, User A receives one email message (this email is responded to two times, and, therefore, becomes a conversation), is added to two events (e.g., User C invited User A to an event), if User C is on both Facebook and LinkedIn, in this case the P score would be calculated as follows:

$P$ score=1/6*2+2/6*5+2/6*5+1/6*10=0.33+1.67+ 1.67+1.67=5.34

Based on these two cases, therefore, User C will rank higher in priority than User B. Note that this can be tracked separately and updated once a week. Weightage of a network e.g. Facebook could be different for different people, and, therefore, in order to personalize the weightage should change over time.

The affinity score can be recalculated after a predetermined time period, such as on a daily basis, and any change in list of priority contacts can be introduced automatically or after user selection. This allows updating the priority contacts based on the most recent activity of the user and any change in relationship. For example, a breakup can result in change in status on Facebook and may immediately result in a drop in communications; therefore such a contact may drop out of the priority contacts list or at least from list of recommended priority contacts provided to the user for selection. Similarly, a conversation with a recruiter can include lots of back and forth messaging and result in a priority contact, but that contact may accordingly fall off the priority contacts list once communication drops off. For example, the weight assigned to a user's Yahoo! inbox could currently be 0.1. This weight assignment is a snapshot of the user's messaging pattern on Yahoo! This weight assignment can change as the user's online behavior changes, e.g., if a user starts engaging on Yahoo! more and gets 50% or more messages from that account as compared to other networks System 300 further includes a recommendation engine 311 to provide a list of contacts the system recommends as priority contacts to enable users to easily identify those contacts that are closer in relationship to the user based on their messaging behavior. The priority contacts list can be generated automatically or it can be generated and then the user is prompted to confirm whether each contact is in fact a priority contact. Users can add one more accounts to the system for aggregation at the centralized account. Contacts can also be imported from the various online accounts of the user registered with the system. All communications across all priority contacts can be analyzed as well as the number of communications exchanged. In one embodiment, if a user follows the recommendation for a priority contact generated by the system, the user can chose to mark the contact as a priority contact and to filter email and social network communications based on priority, thereby solving the information overload problem in the centralized news feed.

Finally, system 300 is further coupled with a priority contacts registry database 320 via a network 312, which can be any type of network capable of sending and receiving data over a wired or wireless connection. System 300 can store and update priority contacts in database 320.

Figure 4:
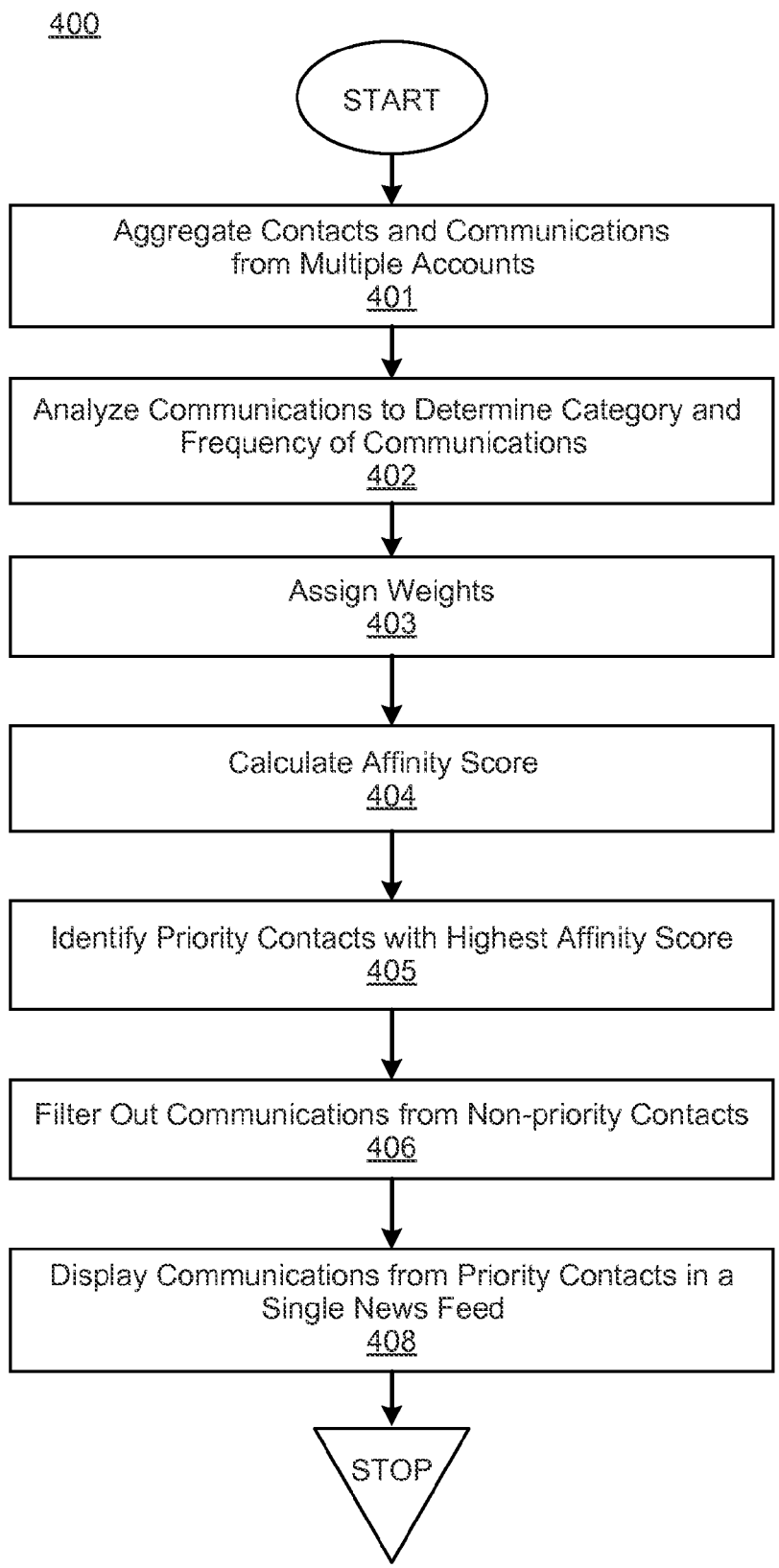
FIG. 4 depicts an example block diagram of a process for automatically generating a set of priority contacts based on their strength of relationship with a user according to one embodiment.

FIG. 4 depicts an example block diagram of a process for automatically generating a set of priority contacts based on their strength of relationship with a user according to one embodiment. In the illustrated embodiment, process 400 begins at operation 401 where contacts of the user and communications from those contacts from multiple online accounts are aggregated into a single set of communications in a centralized queue. In one embodiment, the multiple online accounts associated with a user can include social networks and wireless and email accounts and the communications can include emails, likes, posts, comments, shares, messages, or events, etc. In at least certain embodiments, each account of the multiple accounts can include a different platform having different communications channels and ways of communicating. The communications can then be analyzed in the queue to determine category and frequency of the communications with the user (operation 402) and weights are assigned to each category of communication according to a set of rules adapted to show level of affinity with the user (operation 403).

Then at operation 404, an affinity score can be calculated based on the total weight and frequency of each contact's communications with the user from which a predetermined number of contacts can be identified having the highest affinity score as priority contacts of the user (operation 405). Only communications from the priority contacts are then displayed in a single news feed associated with the centralized account (operation 408) and communications from contacts not identified as priority contacts are filtered out (operation 406). As used herein, a single news feed can be a web feed or other data format used for providing users with frequently updated content. In one embodiment, the content is displayed in a timeline format. The makes a collection of information available to the user in one location. The types of communications and/or content delivered to the news feed (or web feed) includes direct communications, such as email or text messages or any other type of message, social media communications, such as posts, shares, likes, comments, events, pokes, etc., and any other webpage content such as HTML. In at least certain embodiments, the direct email or text communications can be intermixed with the social media and/or webpage communications, and displayed in the news feed. In one embodiment, the display is ordered at least partially based on the time when the communications are received. In other embodiments, the display can be ordered based on other parameters and need not be ordered based on time the communications are received. The frequency of communications can be determined based on number of communications with a contact in each category divided by a total number of communications with all contacts in that category.

As discussed previously, the set of rules are based on tendency of a particular category of communications to indicate strength of relationship with the user. The set of rules can be adaptable based on analyzing communication patterns of the user over time. The frequency of communications of the user with each contact can be recalculated as communications are received in real time and the list of priority contacts of the user can be updated at predetermined times in response thereto. This completes process 400 according to one example embodiment.

FIG. 5 depicts an example graphical interface for displaying communications from multiple online accounts of different types into a single news feed based on prioritized contacts according to one embodiment. In the illustrated embodiment, graphical interface 500 includes a single centralized news feed 502 where the user's communications from priority contacts are displayed as a timeline based on time the communication was received. Interface 500 includes a title bar 501 that includes filters for toggling between displaying news feed 502 and displaying a list of the user's priority contacts (not shown). Title bar 501 further includes a search by name feature and includes keyword fields to provide search criteria for finding contacts from one or more of the user's online networks registered with the system.

Interface 500 further includes a filter 5003 for toggling between displaying only the communications in the news feed from priority contact (as described herein) or displaying communications from all contacts in the news feed, whether or not they are priority. Based on toggling between the selection options, news feed 502 will either display messages from all contacts or only from the user's priority contacts. Interface 500 further includes a filter 504 for toggling between displaying all content from all contacts or only displaying content from popular social posts. In addition, in at least certain embodiments, it is possible to display the communications received by the system in a manner such that all social media communications from all contacts are displayed, while the direct email or text communications are filtered based on priority contacts. Conversely, in other embodiments, it is possible to display all the direct email and text communications from all contacts, while the social media communications are filtered based on priority contacts. A filter 505 is also provided to toggle between accounts for display of messages in the news feed or to display messages from all accounts (as described herein). A user may also manage his or her accounts using filter 506 and may post messages or photos to one or more of the selected accounts of filter 505 using the provided fields 508.

Provided below are descriptions of some devices (and components of those devices) that may be used in the systems and methods described above. These devices may be used, for instance, to receive, transmit, process, or store data related to any of the functionality described above. As will be appreciated by one of ordinary skill in the art, the devices described below may have only some of the components described below, or may have additional components. Embodiments may be practiced with various computer system configurations such as hand-held devices, microprocessor systems, microprocessor-based or programmable user electronics, minicomputers, mainframe computers, or similar systems. The embodiments can also be practiced in distributed computing environments where tasks are performed by remote processing devices that are linked through a wire-based or wireless network.

Figure 6:
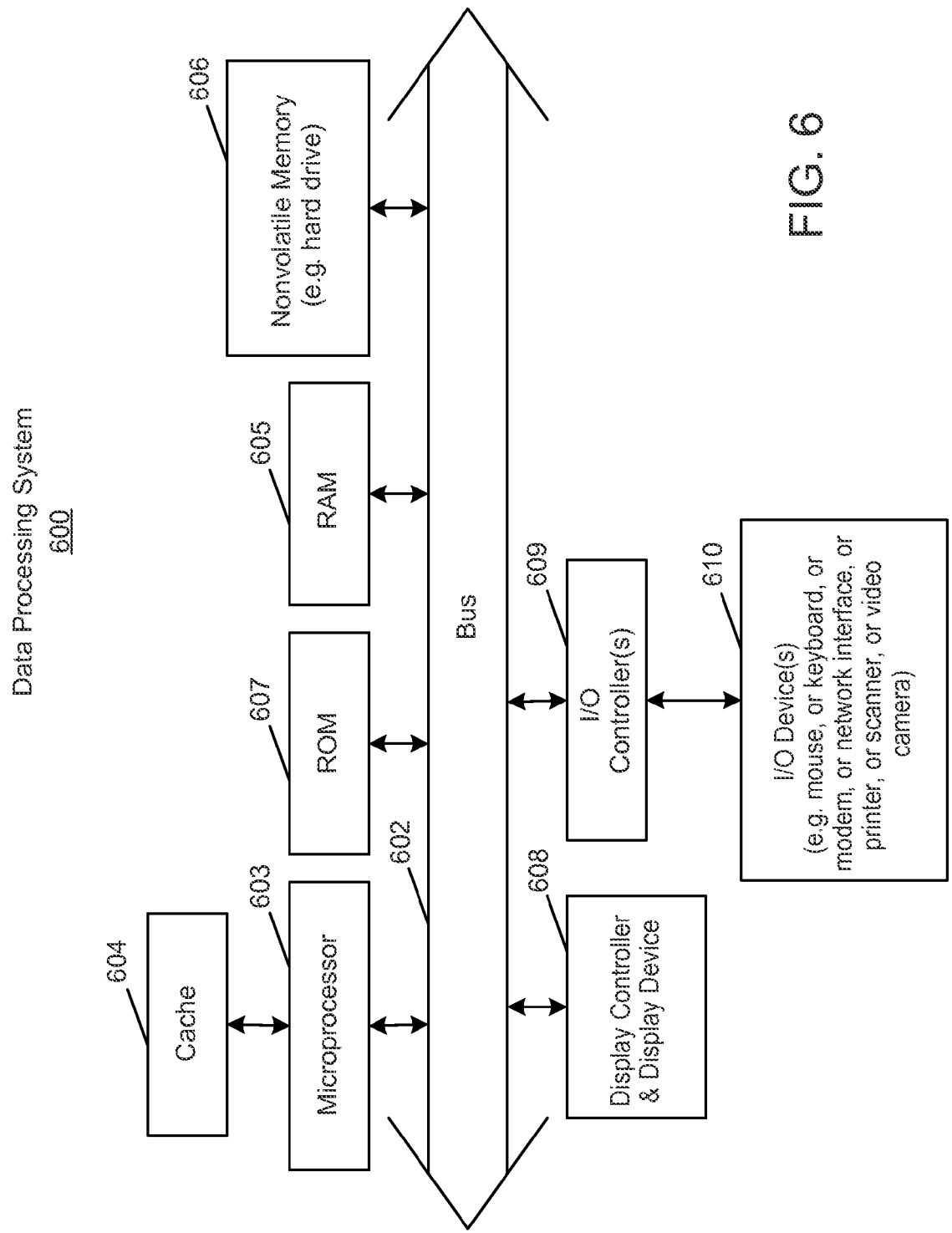
FIG. 6 depicts an example embodiment of a data processing system upon which the techniques disclosed herein can be implemented according to one embodiment.

FIG. 6 depicts an example embodiment of a data processing system upon which the techniques disclosed herein can be implemented according to one embodiment. Note that while FIG. 6 illustrates various components of a data processing system, it is not intended to represent any particular architecture or manner of interconnecting the components as such details are not germane to the techniques described herein. It will also be appreciated that network computers and other data processing systems which have fewer components or perhaps more components may also be used. The data processing system of FIG. 6 may, for example, be a personal computer (PC), workstation, tablet, smartphone or other hand-held wireless device, or any device having similar functionality.

As shown, the data processing system 601 includes a system bus 602 which is coupled to a microprocessor 603, a Read-Only Memory (ROM) 607, a volatile Random Access Memory (RAM) 605, as well as other nonvolatile memory 606. In the illustrated embodiment, microprocessor 603 is coupled to cache memory 604. System bus 602 can be adapted to interconnect these various components together and also interconnect components 603, 607, 605, and 606 to a display controller and display device 608, and to peripheral devices such as input/output ("I/O") devices 610. Types of I/O devices can include keyboards, modems, network interfaces, printers, scanners, video cameras, or other devices well known in the art. Typically, I/O devices 610 are coupled to the system bus 602 through I/O controllers 609. In one embodiment the I/O controller 609 includes a Universal Serial Bus ("USB") adapter for controlling USB peripherals or other type of bus adapter.

RAM 605 can be implemented as dynamic RAM ("DRAM") which requires power continually in order to refresh or maintain the data in the memory. The other nonvolatile memory 606 can be a magnetic hard drive, magnetic optical drive, optical drive, DVD RAM, or other type of memory system that maintains data after power is removed from the system. While FIG. 6 shows that nonvolatile memory 606 as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

Embodiments may also be in the form of computer code stored on a computer-readable medium. Computer-readable media can also be adapted to store computer instructions, which when executed by a computer or other data processing system, such as data processing system 600, are adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon such as a hard drive, floppy disk, DVD, CD-ROM, magnetic-optical disk, ROM, RAM, EPROM, EEPROM, flash memory and equivalents thereto, a magnetic or optical card, or any type of media suitable for storing electronic data. Computer-readable media can also be distributed over a network-coupled computer system, which can be stored or executed in a distributed fashion.

Figure 7:
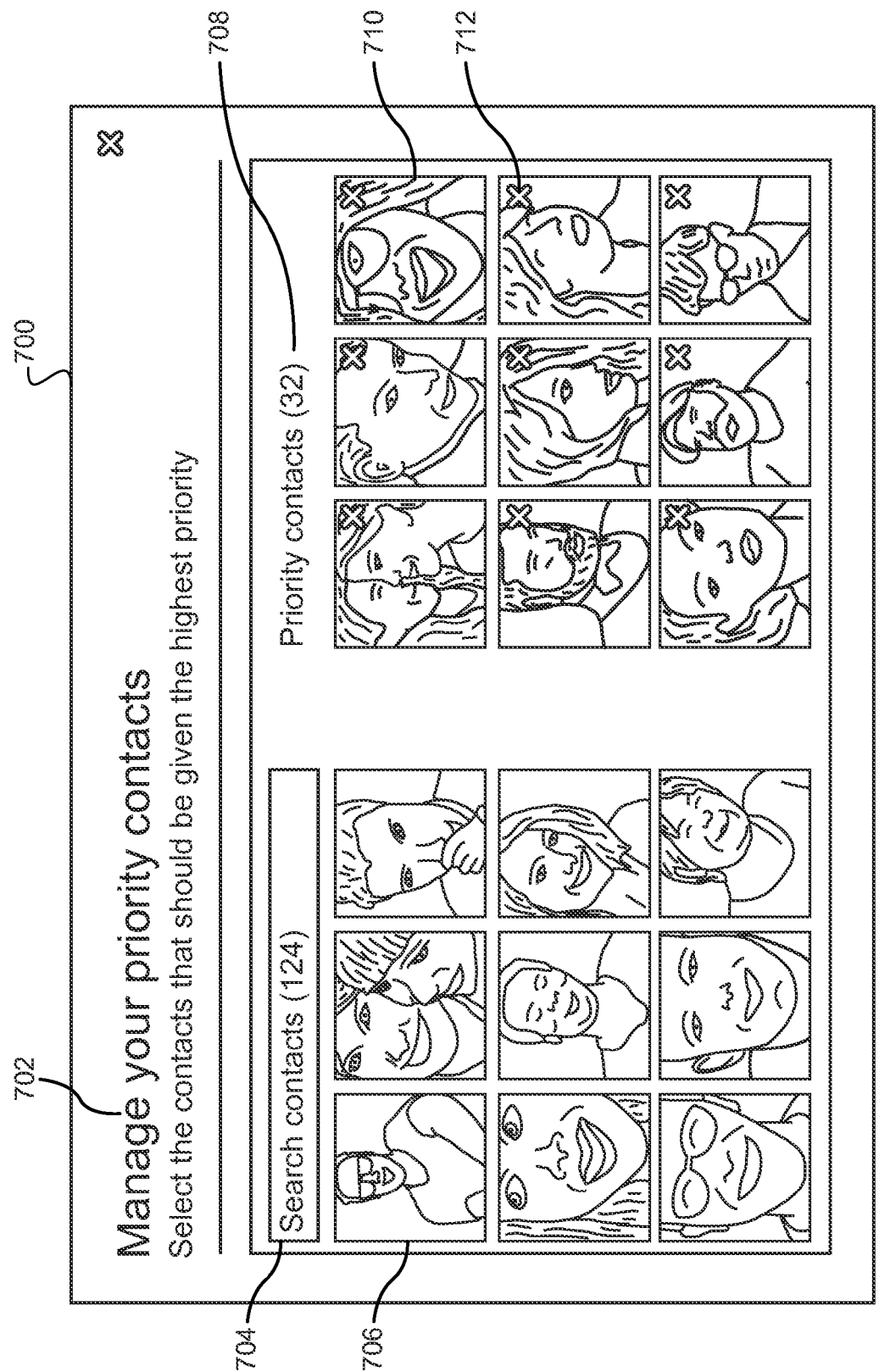
FIG. 7 depicts an example graphical interface for managing priority contacts according to one embodiment.

FIG. 7 depicts an example graphical interface for managing priority contacts according to one embodiment. In the illustrated embodiment, priority contacts graphical interface 700 includes a title bar 702, a first listing of a user's contacts 706, and a second listing of a user's priority contacts 708. Graphical interface 700 allows users to manually view and edit the current listing of priority contacts 708. A search feature is also provided with a keyword search field 704 for users to search through the complete list of contacts and present them in display 706.

In at least certain embodiments, users can manually override their list of priority contacts in graphical interface 700. Users can add contacts to the listing of priority contacts 708 by selecting contacts from listing 706 to be added. Likewise, the listing of priority contacts 708 is provided to allow users to view their priority contacts 710 and to manually delete them if desired using delete tab 712. User interface 700 is not intended to be limiting as other visual configurations or arrangements are possible for presenting priority contacts to users and for enabling them to manually add or delete priority contacts as desired.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a data processing system. That is, the techniques may be carried out in a computer or other data processing system in response executing sequences of instructions stored in memory. In various embodiments, hardwired circuitry may be used independently, or in combination with software instructions, to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Throughout the foregoing description, for the purposes of explanation, numerous specific details were set forth in order to provide a thorough understanding of the invention. It will be apparent, however, to persons skilled in the art that these embodiments may be practiced without some of these specific details. Accordingly, the scope and spirit of the invention should be judged in terms of the claims which follow as well as the legal equivalents thereof.

What is claimed is:

1. A method for automatically generating a set of priority contacts based on their strength of relationship with a user, the method comprising:

aggregating contacts of the user and communications from those contacts across multiple online accounts into a single set of communications in a centralized queue, wherein the multiple online accounts comprise at least one private email account and at least one social media account;

analyzing the communications to determine category and frequency of the communications with the user;

assigning a weight to each category of communication according to a set of rules to show a level of affinity with the user;

calculating an affinity score for each contact based on a summation of the frequency of the communications with the user in each category multiplied by the assigned weight of the corresponding category;

identifying a predetermined number of contacts of the aggregated contacts with the highest affinity score as priority contacts of the user;

sending a single news feed to a user device, the single news feed having only the communications from the priority contacts ordered based at least partially on time of communication, wherein the communications from the priority contacts include both direct communications from the at least one private email account and social communications from the at least one social media account, wherein the direct communications are intermixed with the social communications, and wherein only communications from contacts identified as priority contacts are displayed in the news feed.

2. The method of claim 1, wherein the frequency of communications is determined based on a number of communications with a contact in each category divided by a total number of communications with all contacts in that category.

3. The method of claim 1, wherein the set of rules are based on tendency of a particular category of communications to indicate strength of relationship with the user.

4. The method of claim 1, wherein the set of rules adapt based on analyzing communication patterns of the user over time.

5. The method of claim 1, further comprising storing the priority contacts in a database.

6. The method of claim 1, further comprising:
recalculating the frequency of communications of the user with each contact as communications are received in real time; and
updating the priority contacts of the user at predetermined times in response thereto.

7. The method of claim 1, further comprising enabling user selection of one or more of the multiple online accounts for contacts prioritization.

8. The method of claim 1, wherein the communications include text messages sent from a wireless phone.

9. The method of claim 1, wherein each account of the multiple online accounts includes a different platform having different communications channels and ways of communicating.

10. A system for automatically generating a set of priority contacts based on their strength of relationship with a user, the system comprising:
a processor;
a memory coupled with the processor via an interconnect;
a centralized queue that aggregates contacts of the user and communications from those contacts across multiple online accounts, wherein the multiple online accounts comprise at least one private email account and at least one social media account;
a priority rules engine coupled with the processor and the centralized queue, wherein the priority rules engine:
analyzes the communications in the centralized queue to determine category and frequency of the communications with the user;
assigns a weight to each category of communication according to a set of rules to show a level of affinity with the user;
calculates an affinity score for each contact based on a summation of the frequency of the communications with the user in each category multiplied by the assigned weight of the corresponding category; and
identifies a predetermined number of contacts of the aggregated contacts with the highest affinity score as priority contacts of the user; and
sends a single news feed to a user device, the single news feed having only the communications from the priority contacts ordered based at least partially on time of communication, wherein the communications from the priority contacts include both direct communications from the at least one private email account and social communications from the at least one social media account, wherein the direct communications are intermixed with the social communications, and wherein only communications from contacts identified as priority contacts are displayed in the news feed.

11. The system of claim 10, wherein the frequency of communications is determined based on a number of communications with a contact in each category divided by a total number of communications with all contacts in that category.

12. The system of claim 10, wherein the set of rules are based on tendency of a particular category of communications to indicate strength of relationship with the user.

13. The system of claim 10, wherein the set of rules adapt based on analyzing communication patterns of the user over time.

14. The system of claim 10, further comprising a database to store the priority contacts.

15. The system of claim 10, wherein the frequency of communications of the user with each contact are recalculated as communications are received in real time, and wherein the user's priority contacts are updated at predetermined times in response thereto.

16. The system of claim 10, further comprising a selection mechanism to enable user selection of one or more of the multiple online accounts for contacts prioritization.

17. The system of claim 10, wherein the communications include text messages sent from a wireless phone.

18. The system of claim 10, wherein each account of the multiple online accounts includes a different platform having different communications channels and ways of communicating.

19. The method of claim 1, further comprising sending the priority contacts as a displayed list to the user device, the displayed list of priority contacts being separated from a displayed list of aggregated contacts.

20. The method of claim 19, further comprising receiving a user command to modify the displayed list of priority contacts; and modifying the displayed list priority contacts per the user command.

21. The system of claim 10, wherein the priority rules engine further sends the priority contacts as a displayed list to the user device, the displayed list of priority contacts being separated from a displayed list of aggregated contacts.

22. The method of claim 21, wherein the priority rules engine further:
receives a user command to modify the displayed list of priority contacts; and modifies the displayed list priority contacts per the user command.

\* \* \* \* \*